Figure 1:
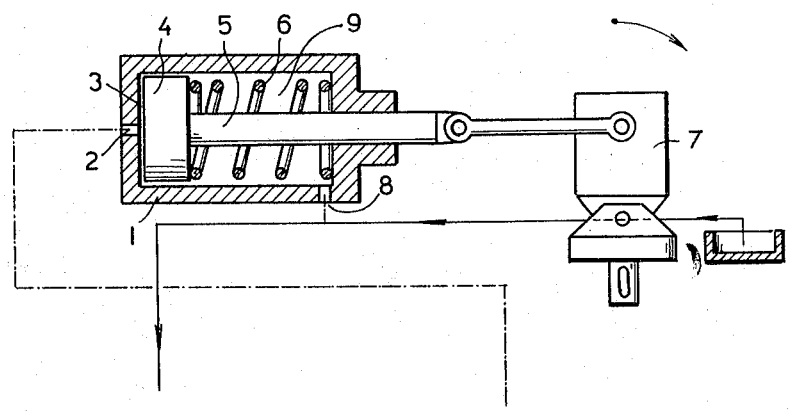

Jan. 10, 1967          K. TLUSTY          3,296,797

CONTROL DEVICE FOR HYDROSTATIC PUMPS OR MOTORS

Filed June 28, 1965          3 Sheets-Sheet 1

INVENTOR

Karel Tlusty

BY

Jan. 10, 1967 K. TLUSTY 3,296,797
CONTROL DEVICE FOR HYDROSTATIC PUMPS OR MOTORS
Filed June 28, 1965 3 Sheets-Sheet 2

INVENTOR.
Karel Tlustý
BY

United States Patent Office 3,296,797
Patented Jan. 10, 1967

3,296,797
CONTROL DEVICE FOR HYDROSTATIC
PUMPS OR MOTORS
Karel Tlusty, Prague, Czechoslovakia, assignor to Technometra, nardoni podnik, Prague, Czechoslovakia
Filed June 28, 1965, Ser. No. 467,493
Claims priority, application Czechoslovakia,
July 15, 1964, 4,100/64
4 Claims. (Cl. 60—52)

The present invention relates to a control device for hydrostatic pumps or motors, at which the discharge of the pump or the rate of flow into the motor, respectively, depends on the discharge pressure of the pump or the inlet pressure of the motor, the device being mainly intended for the control required for ensuring a constant output, at which the product of both the discharge and the discharge pressure must be constant.

In known devices of this sort, the desired interrelation between the discharge and the discharge pressure is attained by means of control systems consisting of a piston, which is exposed to the discharge pressure and of a spring which counterbalances the force acting upon the piston. The stroke of the piston serves for resetting the displacement, this displacement being reset either directly or indirectly.

For achieving a non-linear interrelation between the discharge and the discharge pressure, which is especially required for the constant output control, the counterbalancing force, acting upon the piston is exerted by a spring assembly.

The drawback of these devices consists in that the displacement and not the supplied volume varies in relation to the pressure. Consequently, the required interdependence between the discharge and the discharge pressure can only be attained at a certain and invariable speed and the spring assembly only ensures an approximate non-linear interdependence. Another drawback consists in that the pump is adjusted to the full displacement from the very instant of the start. In case of direct control the known devices have still another drawback, i.e. the large size and great weight of the control device, the slow response and the direct influence of the forces required for resetting the pump upon the control accuracy.

It is an object of the present invention to provide a control device for variable displacement hydrostatic pumps or motors with servo-actuated stroking cylinder for indirect control, comprising an orifice measuring the rate of flow and controlling the distribution valve which, in turn, controls the flow of the control liquid to the stroking cylinder, while the member for measuring the discharge pressure is so accommodated relatively to the orifice that in the course of its movement, the effective cross section of the orifice varies in relation to the discharge pressure of the pump.

According to another feature of this invention, the measuring orifice is formed in the cylindrical part of the body, or alternatively in the axial part of the pressure-measuring member having the shape of a differential piston loaded with a spring and provided with a damping collar with damping groove.

The present invention also relates to the control device, mentioned above, in which the distribution valve of the control device, loaded with a spring, is coaxial to the pressure measuring member, while the space before its front wall on the side of the spring is connected to the pressure space behind the orifice and the space behind its front wall is connected to the pressure space before the orifice.

According to still another feature of the control device, which is the object of this invention, the distribution valve of the control device is provided with a tierod fitted with a head, while the length of the aforementioned tierod is so devised that, in the central position of the distribution valve and in that position of the pressure-measuring member which corresponds to the maximum admissible pressure, the head touches the front wall of the pressure-measuring member.

Finally, the control device according to this invention is also characterized by the facts that the spring of the distribution valve, the spring of the pressure-measuring member, and the basic cross section of the orifice are all adjustable.

Figure 2:
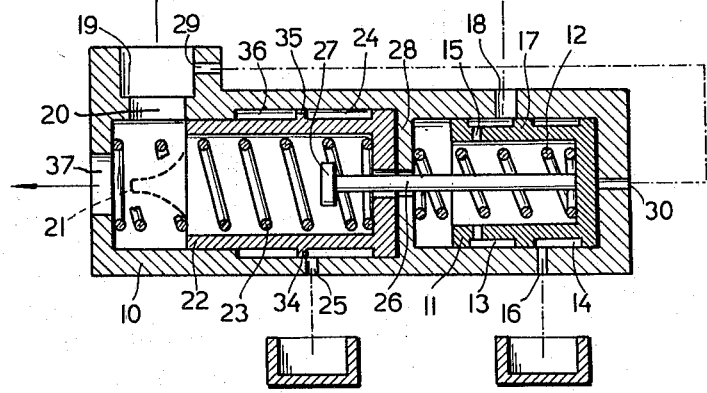
Figure 3:
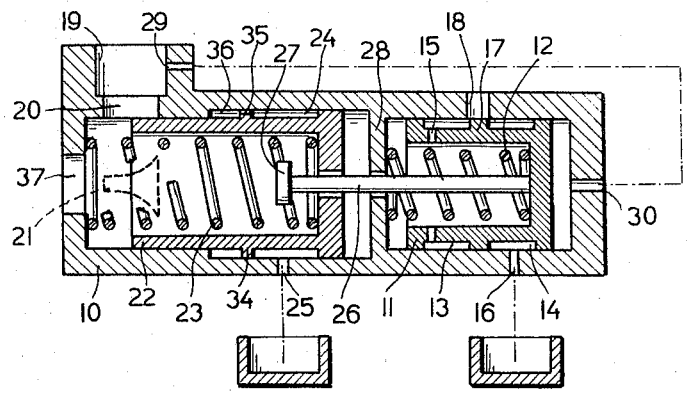
Figure 4:
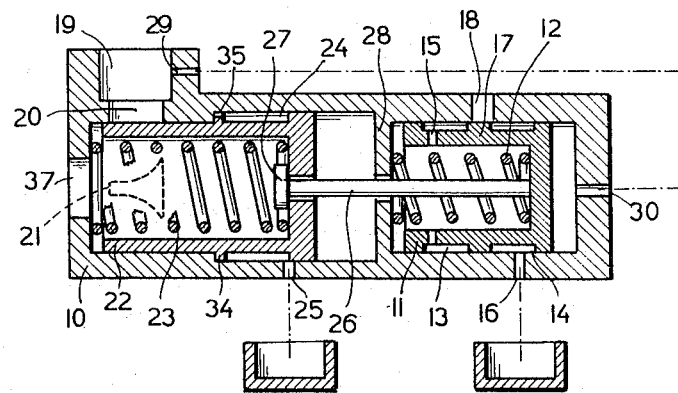
Figure 5:
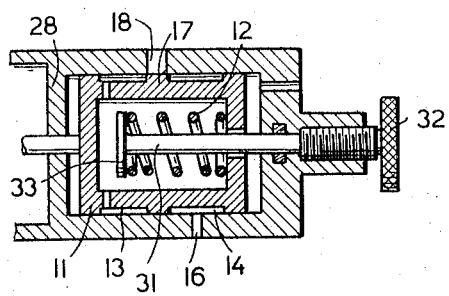
Figure 6:
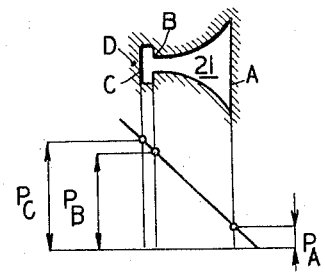
Figure 7:
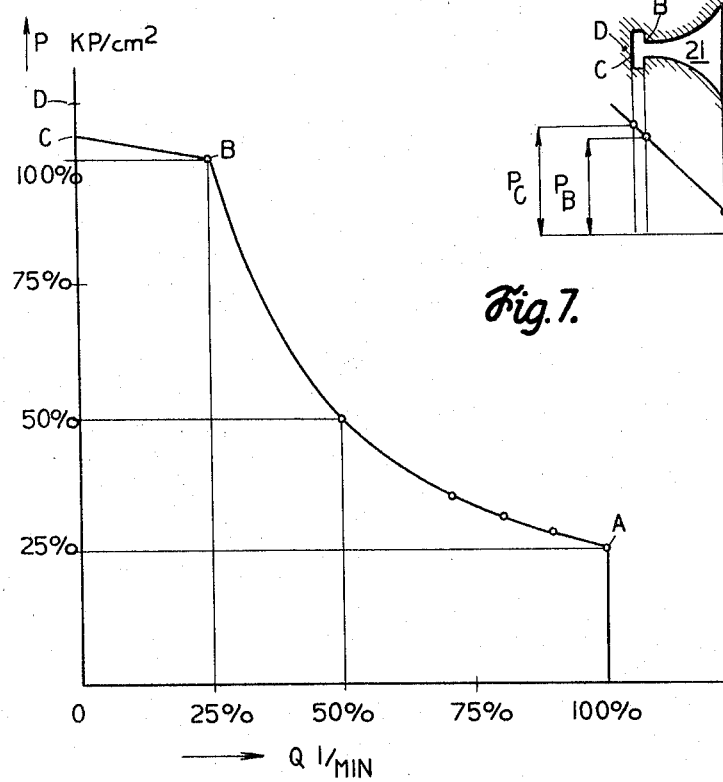

In order that the invention may be more clearly understood one preferred example thereof will now be more thoroughly described with the aid of the accompanying drawings in which:

FIG. 1 diagrammatically illustrates the variable displacement pump with its servo-actuated stroking cylinder, FIGS. 2, 3 and 4 show the pressure-measuring member with the distribution valve in various working positions, FIG. 5 is the longitudinal section of the mechanism for preloading the spring of the distribution valve, FIG. 6 demonstrates the shape of the control orifice and finally, FIG. 7 is the graph showing the relation between and the discharge pressure.

The body 1 of the servo-actuated stroking cylinder is provided with the branch 2 for supply of the control liquid into the stroke space 3 of the piston 4, the piston rod 5 of which is coupled to the member varying the displacement of the pump 7. Through the intake branch 8 the discharge pressure is permanently applied to the inner space 9 of the stroking cylinder in which the stabilizing spring 6 is accommodated. The hollow body 10 of the pressure measuring member 22 is divided by the wall 28 into two coaxial and mutually connected parts. Accommodated in one part is the distribution valve 11 controlling the flow of the control liquid to the intake branch 2 of the stroking cylinder.

The valve 11 is exposed to the force exerted by the spring 12. On the circumference of the valve there are two annular spaces 13 and 14. The first annular space 13 communicates—via the holes 15—with the internal space of the valve 11 i.e. with the space in which there is the discharge pressure. The hole 16 connects the other annular space 14 to the pressure-less medium, i.e. to the tank. The collar 17 between both annular spaces 13 and 14 and the aperture 18 controls the flow of the control liquid to the stroking cylinder. The other part of the hollow body 10 accommodates the intake branch 19 connected to the pump, output and behind the branch 19 there is the orifice 20 measuring the discharge of the pump. The shape 21 of the orifice is selected so as to suit the specific purpose of the device. So, for instance, the shape illustrated in FIG. 2 is suitable for the constant-output control. The branch 37 is connected to the driven hydrostatic motors or cylinder.

The pressure before the orifice 20 is applied—via the apertures 29 and 30—to one side of the distribution valve 11, while the pressure existing behind the orifice 20, i.e. inside the hollow body 10, acts upon the opposite side, so that the pressure drop across the orifice 20, which is proportional to the rate of flow acts upon the distribution valve against the spring 12. The pressure-measuring member 22, having the shape of a differential piston, serves for varying the active cross section of the orifice 20 in relation to the pressure. The pressure-measuring member is accommodated in the other part of the hollow body 10 and it is loaded by the spring 23. The outlet branch 25 connects the annular space 24 of the pressure measuring member 22 with the pressure-less space, i.e. the tank.

The distribution valve 11 is also provided with the tierod 26 carrying the head 27 which serves for controlling the distribution valve 11 by the pressure-measuring member 22 after the delivery pressure has reached its maximum admissible value.

The position of the device before the start of the pump is shown in FIGS. 1 and 2. The stroking piston 4 of the servo-actuated cylinder finds itself in the initial position and the pump is adjusted to zero minimum stroke. Also the distribution valve 11 and the pressure measuring member 22 are both in their initial position and, consequently, the orifice 20 is opened to its full cross section and the control aperture 18 is connected to the first annular space 13 of the distribution valve 11. After the pump has been started, the pressure existing at the discharge side of the pump causes the stroking piston 4 to deflect the adjusting member, e.g. swash plate, to greater displacement of the pump. Unless the magnitude of the discharge pressure exceeds the lower limit of the controlled region, given by the desired relation $p=f(Q)$ (where $p$ means discharge pressure, $f$ a functional value, and $Q$ the discharge), the stroking piston adjusts the pump to the displacement corresponding to the maximum controlled rate of flow and the distribution valve 11 reaches its middle position corresponding to the constant (i.e. to the rated) pressure drop across the orifice 20. In case the magnitude of the discharge pressure rises above the lower limit of the controlled region, the pressure measuring member 22 reduces the cross section of the orifice 20 whereby the pressure drop across the orifice 20 increases so that the distribution valve 11 deflects from the middle position against the spring 12, the control aperture 18 begins to communicate with the second annular space 14 and the liquid begins to be discharged from the stroking cylinder.

This process continues until the discharge volume corresponds to the constant (rated) pressure drop across the orifice 20. An inverse process takes place when the discharge pressure decreases. The control device also responds, in a similar way, to the discharge variations due to the changing speed of the pump. The stationary state of the pressure-measuring member in the controlled region is illustrated in FIG. 3, where the distribution valve 11 finds itself in the middle position and the pressure-measuring member 22 partly closes the orifice 20.

If, incidentally, the magnitude of the discharge pressure reaches its maximum admissible value, for instance in case of a sudden overloading of the pump or in case of a slow response of the distribution valve 11, the distribution valve 11 is controlled directly by the pressure measuring member 22, whereby a forced displacement of the slide valve 11 against the spring 12 and, consequently, also an accelerated adjustment to a smaller displacement takes place. This state is illustrated in FIG. 4. For improving the dynamic properties of the control device, the pressure measuring member 22 can be damped for instance by means of the damping collar 34 provided with a fine groove 35. In this way the damping space 36 is created.

The controlled parameters, for instance in case of the constant output regulation, can be changed by varying the rated pressure drop across the orifice 20 which, in turn, can be attained by variable preloading of the spring of the distribution valve 11—see FIG. 5. The preloading of the spring 12 is varied manually by means of the spindle 31. At its outer end, the spindle 31 is provided with a threaded section and with the control wheel 32, while on the inner side it has the supporting disk 33.

The pressure measuring member 22 can also be designed so that, for instance, the cross section of the orifice is varied by means of a profiled mandrel protruding axially into the circular aperture of the orifice, the mandrel being displaced by the action of the delivery pressure. The desired interrelation between the discharge and the discharge pressure can be attained by choosing a suitable shape of the profiled mandrel. Also the mutual positional arrangement of the distribution valve and the pressure-measuring member can be designed in another way, for instance by accommodating both these elements parallel to each other. In the example of the control device according to this invention, which is illustrated in the accompanying drawings the stroking cylinder is supplied with the control liquid directly from the discharge side of the pump and the influence of the variable discharge pressure is eliminated by the permanent action of this pressure upon the servo-actuated stroking piston of the stroking cylinder. Alternatively, the stroking cylinder can be supplied from an auxiliary source of a constant pressure in which case the compensation of the pressure variability can, of course, be dispensed with.

The control device according to this invention can also be used for controlling the hydraulic motors. In this instance the intake branch 19 of the pressure measuring member 22 is connected to the discharge side of the pump and the outlet branch 37 is connected to the inlet of the hydraulic motor.

FIG. 6 shows the shape of the orifice 21 which is required for achieving a typical functional relation $p=f(Q)$ which is demonstrated in FIG. 7. Also illustrated in FIG. 6 are the characteristics Z of the spring 23 and the respective forces $P_A$, $P_B$, $P_C$ of the spring 23 at the points A, B and C, these points representing the individual positions of the pressure-measuring member. The relation demonstrated in FIG. 7 has the form of a hyperbola between the points A and B (corresponding to a constant output $pQ$=const.), while between the points B and C it is a straight line corresponding to an approximately constant pressure $p$.

The point D corresponds to the maximum of the admissible pressure which is secured by the direct action of the tierod 26 and the head 27. Both the discharge pressure $p$ and the discharge $Q$ in FIG. 7 are given in percents of the maximum controlled discharge pressure or discharge, respectively.

The control device to which the present invention relates can be used in connection with various hydrostatic mechanisms, especially in rotary driving units used in machinery, in the field of mineral mining, in building industry, in elevators, etc.

What I claim is:

1. A control device for hydrostatic pumps or motors comprising a hollow body divided by a central wall into two mutually interconnected parts, in the first part being slidably accommodated a distribution valve controlling the flow of control liquid to an intake branch of a servo-actuated stroking cylinder coupled to a member varying the displacement of the pump, said distribution valve being loaded by a spring and having two annular circumferential spaces on an axial part, the first annular space communicating via holes in the axial part with an internal space of said distribution valve, the other annular space communicating via holes in the hollow body with the pressure-less medium of a control liquid tank, a collar situated between both said annular spaces movable together with the distribution valve and opening and closing an aperture in the hollow body connected by a tube to the aforementioned servo-actuated stroking cylinder, the other part of the hollow body being connected to the pump output by an intake branch, having an orifice formed in the hollow body, from which the pressure control liquid through an outlet branch flows to driven hydrostatic motors, in said other part of the hollow body being slidably accommodated a pressure measuring member having the shape of a differential piston loaded by a spring and varying by its movement the active cross section of said orifice in relation to the pressure of the control liquid, the intake branch before the orifice being connected to a space at one side of the distribution valve, an inner space of the pressure measuring member being connected with a space on the other side of the distribution valve.

2. A control device for hydrostatic pumps or motors comprising a hollow body divided by a central wall into two mutually interconnected parts, in the first part being slidably accommodated a distribution valve controlling the flow of control liquid to an intake branch of a servo-actuated stroking cylinder coupled to a member varying the displacement of the pump, said distribution valve being loaded by a spring and having two annular circumferential spaces on an axial part, the first annular space communicating via holes in the axial part with an internal space of said distribution valve, the other annular space communicating via holes in the hollow body with the pressure-less medium of a control liquid tank, a collar situated between both said annular spaces movable together with the distribution valve and opening and closing an aperture in the hollow body connected by a tube to the aforementioned servo-actuated stroking cylinder, the other part of the hollow body being connected to the pump output by an intake branch, having an orifice formed in the hollow body, from which the pressure control liquid through an outlet branch flows to driven hydrostatic motors, in said other part of the hollow body being slidably accommodated a pressure measuring member having the shape of a differential piston loaded by a spring and varying by its movement the active cross section of said orifice in relation to the pressure of the control liquid, the intake branch before the orifice being connected to a space at one side of the distribution valve, an inner space of the pressure measuring member being connected with a space on the other side of the distribution valve, the distribution valve being provided with a tierod protruding through a hole in the central wall of the hollow body and through a hole in a front part of the pressure measuring member into its inner space, where it is fitted with a head, the length of the tierod being so devised, that in the central position of the distribution valve and in the position of the pressure measuring member corresponding to the maximum admissible pressure it touches the front part of the pressure measuring member.

3. The control device for hydrostatic pumps or motors as in claim 2, wherein the pressure measuring member has on the circumference of an axial part a damping collar provided with a fine axial groove and movable within a damping ring space created in the hollow body.

4. A control device for hydrostatic pumps or motors comprising a hollow body divided by a central wall into two mutually interconnected parts, in the first part being slidably accommodated a distribution valve controlling the flow of control fluid to a servo-actuated stroking cylinder coupled to a member varying the displacement of the pump, said distribution valve being loaded by an adjustable spring and having two annular circumferential spaces in an axial part, the first annular space communicating via holes in the axial part with an internal space of said distribution valve, the other annular space communicating via holes in the hollow body with the pressure-less medium of a control liquid tank, a collar situated between both said annular spaces movable together with the distribution valve and opening and closing in turn the aperture in the hollow body connected by a tube to the aforementioned servo-actuated stroking cylinder, the other part of the hollow body being connected to the pump output by an intake branch ending against an orifice formed in an axial part of a pressure measuring member accommodated slidably in the hollow body and having the shape of a differential piston loaded by an adjustable spring and varying by its movement against the intake branch the active section of said orifice, the intake branch before the orifice being connected to a space on one side of the distribution valve, an inner space of the pressure measuring member being connected with a space on the other side of the distribution valve, the distribution valve being provided with a tierod protruding through a hole in the central wall of the hollow body and through a hole in the front part of the pressure measuring member into its inner space, where it is fitted with a head, the length of the tierod being so devised that in the central position of the pressure measuring member corresponding to the maximum admissible pressure it touches the front part of the pressure measuring member.

References Cited by the Examiner
UNITED STATES PATENTS

| 2,284,897 | 6/1942 | Harrington | 60—52 X |
| 2,472,477 | 6/1949 | Harrington et al. | 60—52 |
| 2,600,632 | 6/1952 | French | 60—52 X |

EDGAR W. GEOGHEGAN, *Primary Examiner.*